UNITED STATES PATENT OFFICE.

WILLIAM MACRONE AND WILLIAM MACKENZIE, OF GLASGOW, NORTH BRITAIN.

IMPROVEMENT IN COMPOSITIONS FOR STEREOTYPING.

Specification forming part of Letters Patent No. 153,095, dated July 14, 1874; application filed February 21, 1874.

*To all whom it may concern:*

Be it known that we, WILLIAM MACRONE and WILLIAM MACKENZIE, both of Glasgow, in the county of Lanark, North Britain, have invented certain Improved Composition for Stereotyping, of which the following is a specification.

The object of our invention is a composition of which to make the molds used in producing stereotype-plates, the said composition coning of plaster-of-paris, red ocher, and starch.

In making the molding-composition, we use, preferably, thirty parts of plaster, two parts of red ocher, and one part of starch. These are mixed together, and water is added until the preparation is sufficiently plastic to be applied to the type in the usual manner, pressure being employed, if necessary, to force it thoroughly into the faces of the types. As soon as the preparation is set it is removed from the types and dried, when it is ready for use.

We claim—

The within-described composition for stereotype-molds, consisting of plaster-of-paris, red ocher, and starch.

WILLIAM MACRONE.
WILLIAM MACKENZIE.

Witnesses:
EDWARD FISHER BAMBER,
JOHN CLARK.